United States Patent [19]

Bednarczyk

[11] Patent Number: 4,736,348
[45] Date of Patent: Apr. 5, 1988

[54] METHOD AND APPARATUS FOR LOGGING THE CHARACTERISTICS OF MATERIALS FORMING THE WALLS OF A BOREHOLE

[75] Inventor: Adam Bednarczyk, Carrollton, Tex.

[73] Assignee: Mobil Oil Corporation, New York, N.Y.

[21] Appl. No.: 899,135

[22] Filed: Aug. 21, 1986

[51] Int. Cl.⁴ .............................................. G01V 1/40
[52] U.S. Cl. ...................................... 367/69; 367/28; 367/43
[58] Field of Search .................. 367/69, 28, 43, 30, 367/47, 35; 364/422

[56] References Cited

U.S. PATENT DOCUMENTS

| | | | |
|---|---|---|---|
| 3,369,626 | 2/1968 | Zemanek, Jr. | 181/0.5 |
| 3,676,842 | 7/1972 | Lee | 367/30 |
| 3,718,204 | 2/1973 | Groenendyke | 181/0.5 |
| 3,728,672 | 4/1973 | Dennis et al. | 340/15.5 |
| 3,872,246 | 3/1975 | Schneider | 358/85 |

Primary Examiner—Salvatore Cangialosi
Assistant Examiner—Ian J. Lobo
Attorney, Agent, or Firm—Alexander J. McKillop; Michael G. Gilman; George W. Hager, Jr.

[57] ABSTRACT

A borehole televiewer logging tool employs a transducer assembly having a transmitter of acoustic energy pulses and a receiver of acoustic energy pulses representing reflections of the transmitted acoustic energy pulses from the walls of a borehole traversing a subsurface formation. The transducer assembly is rotated within the borehole and also advanced along the borehole. The received reflection signals are corrected for amplitude modulation resulting from oblique angles of incidence of the transmitted acoustic energy pulses when the logging tool is off-center of the borehole, is in an eliptical borehole, or is tilted from the vertical axis of the borehole. The corrected reflection signals modulate an image display so that the full 360° of the borehole wall can be delineated.

3 Claims, 6 Drawing Sheets

METHOD AND APPARATUS FOR LOGGING THE CHARACTERISTICS OF MATERIALS FORMING THE WALLS OF A BOREHOLE

BACKGROUND OF THE INVENTION

This invention relates to acoustic logging of boreholes and, more particularly, to a method and apparatus for determining the characteristics of the material forming the walls of the boreholes by logging the amplitudes of acoustic energy reflections from the walls of the boreholes.

In U.S. Pat. Nos. 3,369,626; 3,718,204; and 3,728,672, there are disclosed methods of and apparatus for scanning the walls of a borehole with acoustic energy. A transmitter and a receiver of acoustic energy are rotated within the borehole. The transmitter is cyclically energized to provide a beam of acoustic energy pulses for scanning the walls of the borehole. Reflected acoustic pulses are received by the receiver between transmitted acoustic pulses and are converted to reflection signals for recording on an electron beam display device. A sweep signal is generated each time the acoustic energy beam is rotated through a 360° scanning pattern. Such sweep signal is applied to the horizontal deflection plates of the display device to sweep an electron beam horizontally across the face of the display device. The reflection signals are applied to the Z-axis of the display device to intensity modulate the electron beam as the beam is swept across the face of the display device to provide a picture which is a function of the time or distance from the transmitter and receiver to the wall of the borehole and of the hardness of the borehole wall.

In both the above-described patents the combination of transducer rotation along with vertical movement of the logging tool along the length of the borehole results in a continuous spiral of the borehole wall being scanned. The resulting display is a picture of the characteristics of the material forming the walls of the borehole at different depth points.

SUMMARY OF THE INVENTION

The present invention is directed to a method and system for logging the characteristics of the material forming the walls of the borehole traversing a subsurface formation. A borehole logging tool includes a transducer assembly having a transmitter of acoustic energy pulses and a receiver of acoustic energy pulses representing reflections of the transmitted acoustic energy pulses from the walls of the borehole. The transducer assembly is rotated within the borehole and also advanced along the borehole. An electron beam is swept across the face of the electron beam display device in response to the rotation of the transducer assembly. The received reflection signals modulate the electron beam sweep to present a visual image of the characteristics of the material forming the walls of the borehole. Any amplitude modulation of the received reflection signals, due to (i) the transducer assembly being off-center of the borehole, (ii) the transducer assembly being tilted from the vertical axis of the borehole, or (iii) the borehole being eliptical in configuration, is corrected in accordance with the present invention prior to the application of such signals to the display device so that the entire 360° of the borehole wall will be delineated on the display device.

More particularly, the received reflection signals are corrected for amplitude modulation resulting from oblique angles of incidence of the transmitted acoustic energy pulses with the borehole wall. The amplitude modulation is in the form of multiplicative noise which is removed in the following manner. Firstly, the logarithm of the reflection signals is taken such that the multiplicative noise becomes additive. Secondly, a high-pass filtering of the logarithm of the reflection signals is carried out. This removes the lower frequency multiplicative noise from the higher frequency portions of the borehole reflection signals which carry the desired borehole configuration information. Thirdly, the exponential of the filtered logarithm of the reflection signals is taken as the final output of the correction process.

DESCRIPTION OF THE PREFERRED EMBODIMENT

Figure 1:
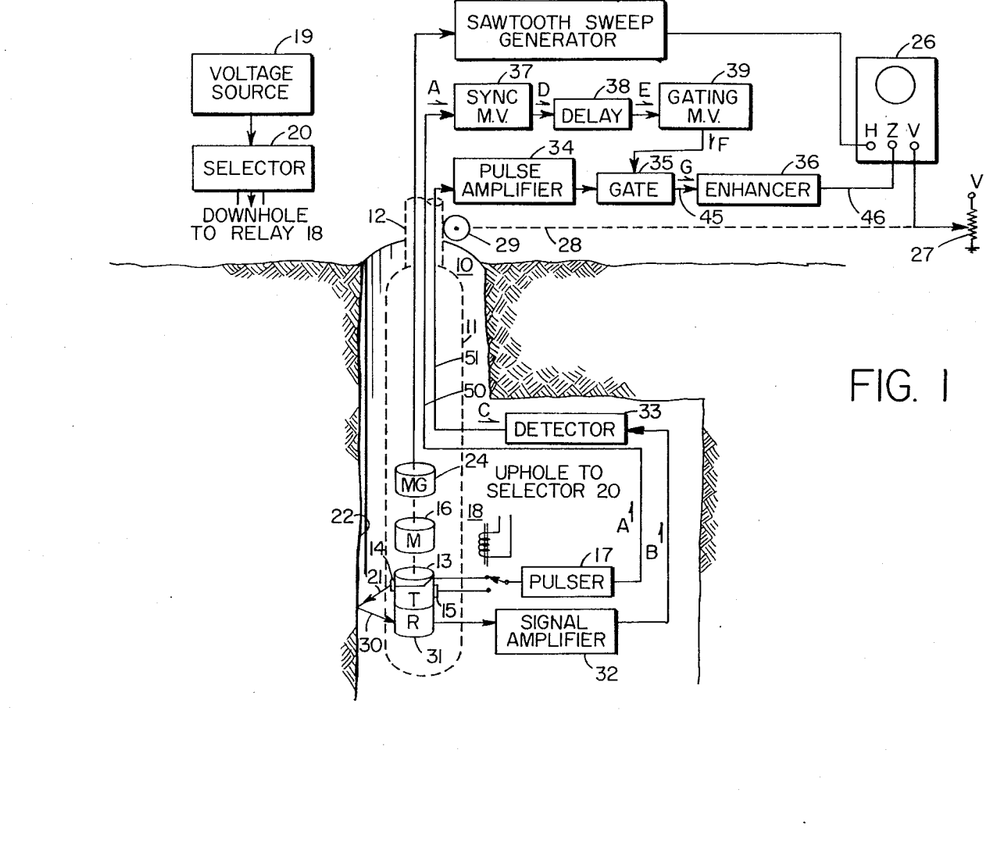
FIG. 1 illustrates a borehole televiewer logging system with which the signal enhancing technique of the present invention may be employed.

The signal enhancing technique, as embodied in the present invention, is particularly adapted for use with borehole logging apparatus of the type illustrated in FIG. 1. For the purpose of illustrating the type of logging operation in which the signal-enhancing technique of the present invention best operates, a general description of the logging apparatus shown in FIG. 1 will be first presented, following which details of the signal-enhancement operation will be described.

Referring now to FIG. 1, there is illustrated one embodiment of a logging system for carrying out logging operations in a borehole 10. A borehole logging tool 11 is lowered into borehole 10 by means of a logging cable 12. Logging tool 11 comprises a transducer assembly 13 which acts as both a transmitter and receiver of acoustic energy. The beam of high frequency acoustic energy is rotated within the borehole to circularly scan the walls of the borehole. Such rotation is effected by means of motor 16. While it is understood that transducer assembly 13 comprises separate transmitter and receiver portions, a single transducer acting both as transmitter and receiver may be utilized. The transmitter portion of transducer assembly 13 consists of two transmitters 14 and 15 which are rotated about the borehole axis by means of motor 16. Pulser 17 is selectively applied to transmitters 14 and 15 by way of relay 18. Voltage is applied from voltage source 19 to relay 18 by way of selector 20. Selector 20 is a switch located uphole by which the polarity of the voltage to be applied to relay 18 is selected. A voltage polarity in one direction energizes relay 18 to connect the output of pulser 17 to transmitter 14. A polarity in the opposite direction energizes relay 18 to couple the output of pulser 17 to transducer 15. Hence, only one transmitter, either transmitter 14 or transmitter 15, will be operative at any given time, the frequency of the acoustic energy transmitted by way of beam path 21 toward the wall 22 of borehole 10 being determined by the selector switch 20 whose setting determines which transmitter is coupled to pulser 17. Pulser 17 may, for example, produce in the order of 2,000 excitation pulses per second. Thereupon, transmitter 14, for example, will produce an acoustic energy burst rate in the order of 2,000 bursts per second. A suitable frequency of the pulses of each acoustic energy burst may be, for example, 2 megahertz.

Logging tool 11 also includes a magnetometer 24, mounted for rotation with the logging tool 11, which produces an output pulse each time magnetic North is detected by said magnetometer during rotation. Such magnetometer output pulse is applied uphole to sawtooth sweep generator 25 which provides a horizontal sweep signal to the horizontal deflection plates of an electron beam display device 26 for horizontally driving an electron beam across the face of display device 26.

Each horizontal sweep of the electron beam across the display device 26 is displaced vertically from the start of the sweep to the end of the sweep in proportion to the vertical movement of the logging tool 11 within the borehole 10. Such displacement is provided by means of a potentiometer 27 which is coupled by electromechanical linkage 28 to a sheave 29 over which logging cable 12 passes. Vertical advancement of logging cable 12 along the borehole axis rotates sheave 29, such rotation causing electromechanical linkage 28 to vary the location of the wiper arm on potentiometer 27, thereby applying to the vertical deflection plates of display device 26 a voltage which is proportional to the depth of the logging tool within the borehole. The resulting picture displayed on display device 26 is a series of side-by-side, substantially horizontal beams, the start of each beam trace located at the vertical position on the face of the display device where the preceding beam trace terminated.

Reflected acoustic energy pulses 30 are received by a receiver portion 31 of transducer assembly 13, and signals representative of such reflections are applied to the Z-axis of display device 26 by way of a signal amplifier 32 and detector 33, located downhole, and a pulse amplifier 34, gate 35, and enhancer 36 located on the surface of the earth. Such input to the Z-input terminal of display device 26 serves to intensity modulate the electron beam in accordance with the amplitudes of the reflection signals.

Ordinary logging cables are not suitable for transmission of high frequency signals, such as 2 megahertz, to the surface; therefore, after being amplified by signal amplifier 32, the reflection signals are applied to detector 33 which generates a lower frequency signal in the form of the envelope of the reflection signals. Such lower frequency signals, preferably in the range of 20–50 kilohertz, can be transmitted to the surface over ordinary logging cable without appreciable signal loss. The output of detector 33 is applied to the input of pulse amplifier 34 by means of conductor 51.

Pulser 17 also provides an output to a sync multivibrator 37, delay 38, and gating multivibrator 39. The output of gating multivibrator 39 is an indication of the time period between transmitted acoustic energy pulses and during which reflected acoustic energy pulses are expected to be received at receiver 31, such output being applied to gate 35 to allow reflecting signals to pass from pulse ampifier 34 through gate 35 and enhancer 36 to the modulating input of display device 26.

When pulser 17 generates an excitation pulse, a portion of this pulse cross-feeds into receiver 31. Also, when a sync pulse is generated by pulser 17 and sent uphole via conductor 50, a portion of the pulse cross-feeds into receiver conductor 51. To prevent these cross-feed signals from intensity modulating the electron beam of display device 26, gate 35 is open only during that portion of time during which reflected pulses are expected to be received from the walls of the borehole. Each time a sync pulse is received by sync multivibrator 37, it triggers into its unstable state for an output for a period of time almost as long as the time period between transmitted acoustic pulses. At the same time that the output of sync multivibrator 37 goes positive, a delay monostable multivibrator 38 is triggered into its unstable stage for a period of time ending just prior to the anticipated arrival time of a reflected pulse at receiver 31. As the trailing edge of the output of delay multivibrator 38 goes negative, a gating monostable multivibrator 39 is triggered into its unstable state to generate a positive-going output, which triggers gating multivibrator 39 to provide a signal to gate 35 to allow passage therethrough of only those signals representative of reflected pulses. Therefore, only the envelopes of the reflection signals pass through gate 35 to enhancer 36.

Figure 2:
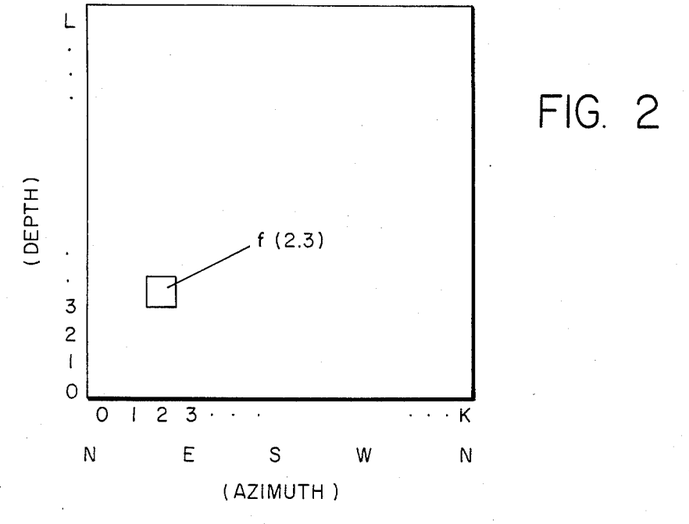
FIG. 2 illustrates a two-dimensional light intensity function representing the characteristics of the material forming the walls of the borehole.

These reflection signals represent two types of data. The amplitude of the reflection signal versus depth and azimuth, and the time of arrival of the reflection signal versus depth and azimuth. These reflection signals are presented on display device 26 as a two-dimensional, light-intensity function $f(k,l)$ where $k$ is a row (line) number on the display and $l$ is a point (pixel) number on a line. The total number of lines in the image is L and the total number of pixels per line (equal to the total number of columns) is K. The value of f at spatial coordinates (k,l) of FIG. 2 is equal to the amplitude (or time of arrival) of the reflection signal received by the logging tool's receiver at azimuth k and depth l. This value f(k,l) will determine the intensity of the pixel (k,l) on the display. The monochrome image on the display consists of, for example, 512 horizontal lines by 512 pixels per line. This represents 512 scan lines from NORTH to NORTH (N-N) and 512 events per rotation of the borehole logging tool. Very often monochrome images are translated to color images, color being assigned to each pixel based on its intensity. For example, blue color is usually assigned to low intensities, red color to high intensities, and the remaining rainbow colors to the in-between intensities.

Figure 3:
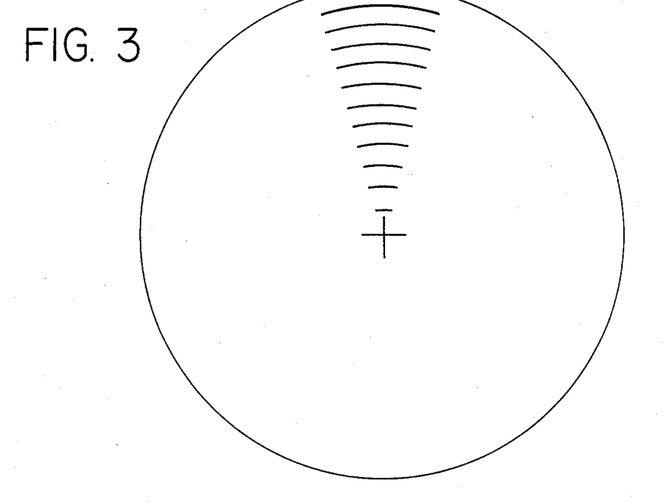
FIGS. 3-4 illustrate transmitted and received acoustic energy signals, respectively, in a borehole with the logging tool centered in the borehole.
Figure 4:
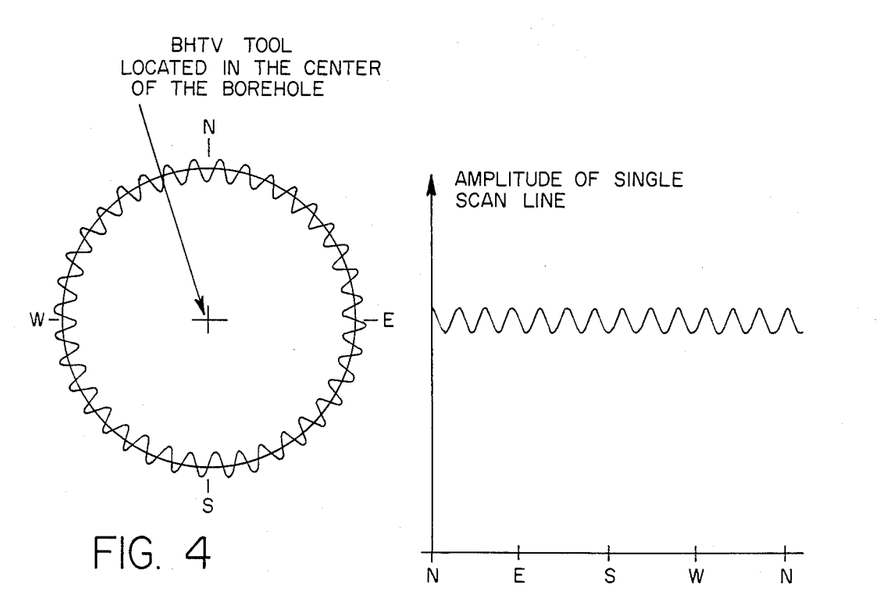
Figure 5:
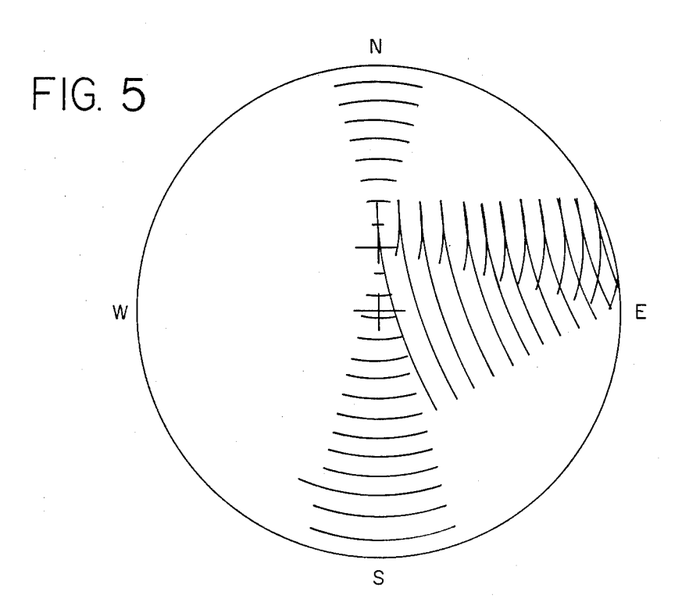
FIGS. 5-6 illustrate transmitted and received acoustic energy signals, respectively, in a borehole with the logging tool off-centered in the borehole.
Figure 6:
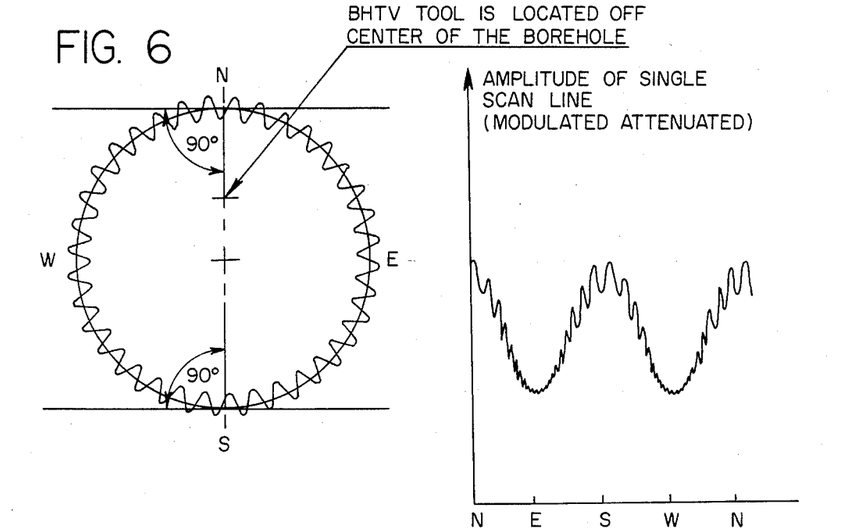
Figure 7:
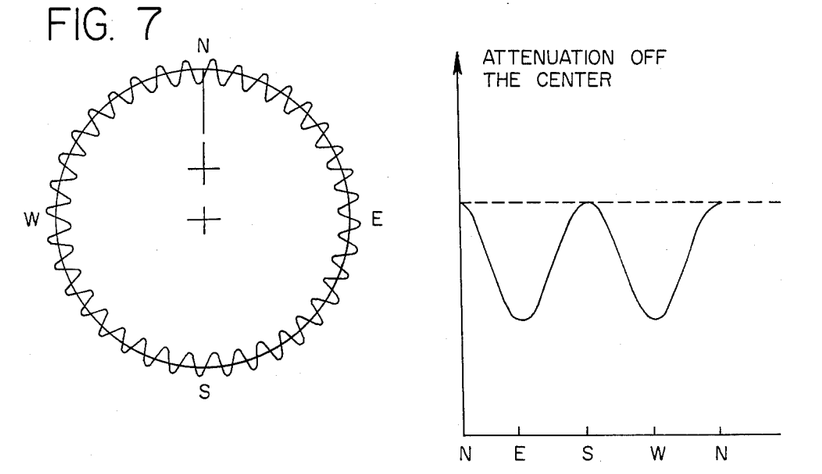
FIG. 7 illustrates the amplitude modulation function for the received acoustic energy signal of FIG. 6.

The ideal logging conditions for producing such monochrome or color images is with the logging tool oriented vertically in the center of a borehole where the cross-section is a circle. Images generated by the logging tool in such ideal conditions contain nothing but desired information about the borehole wall. With the borehole logging tool 10 oriented vertically in the center of a constant diameter borehole, all the acoustic energy pulses from the transmitter have a 90° angle of incidence with the borehole wall as shown in FIG. 3. This results in the normal (i.e., orthogonal) reflection of such pulses back to the receiver with the amplitudes shown in FIG. 4 for a single 360° scan. However, such ideal conditions are seldom met. With the borehole logging tool off-center within the borehole, for example, only those acoustic energy pulses in the off-center direction will have a 90° angle of incidence with the borehole wall, as shown in the N-S direction of FIG. 5. Other pulses directed away from the N-S direction, such as shown in the E direction, will have an oblique angle of incidence with the borehole wall, resulting in a greatly attenuated (i.e., amplitude modulated) reflection pulse as detected by the off-center receiver. Amplitude attenuation is predominant in the E-W directions of reflection, as seen in FIG. 6, for a single 360° scan. As a result, the images represent degraded information about the borehole wall. The reflection signals from which the images are generated are modulated in accordance with the attenuation curve of FIG. 7 for the offset of the logging tool from the center of the borehole as shown in FIG. 6. Similarly, if the borehole is elliptical, or if the transducer assembly is not oriented vertically within the borehole, a low frequency modulation (i.e., multiplicative noise) is generated.

Figure 8:
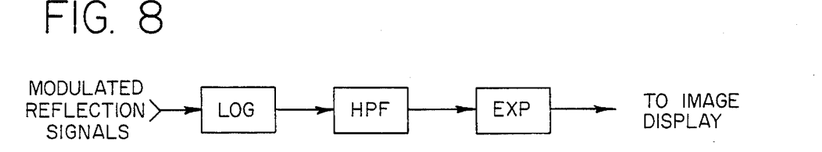
FIG. 8 is a algorithm illustrating the signal enhancing steps of the present invention.

It is, therefore, a specific feature of the present invention to compensate for any such unwanted amplitude modulation of the reflection signals. This compensation is carried out by the signal enhancer 36 which removes such unwanted modulation in the reflection signals prior to their being applied to the Z-input terminal of display device 26 for intensity modulation of the electron beam. In a preferred embodiment, the signal enhancer 36 is a filter which removes the undesired amplitude modulation from the data generated by the logging tool. The filter function, or correction function, of signal enhancer 36 is based on the algorithm of FIG. 8, where LOG is the logarithm of the recorded reflection signals, HPF is the high pass filtering of the logarithm of the reflection signals, and EXP is the exponential of the filtered reflection signals.

Figure 9:
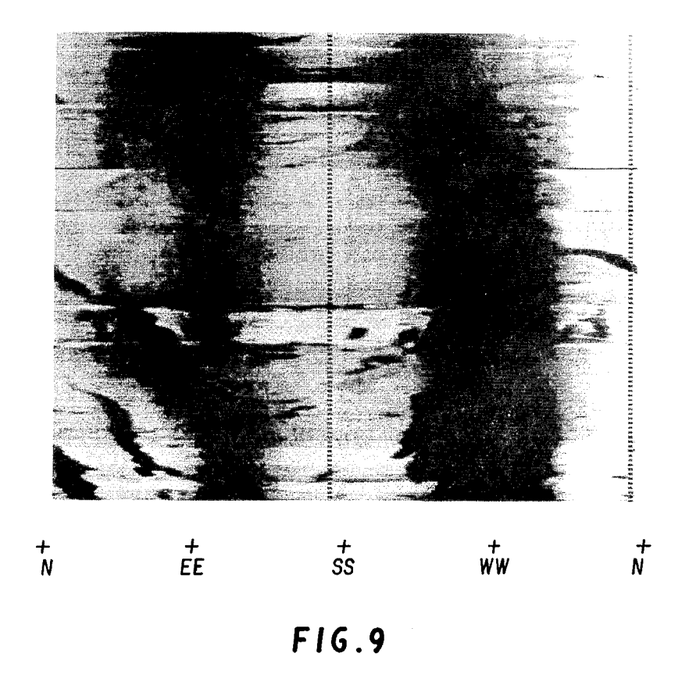
FIG. 9 illustrates an image display of the type shown in FIG. 2 for a logging tool off-centered in a borehole before application of the signal enhancing technique of the present invention.
Figure 10:
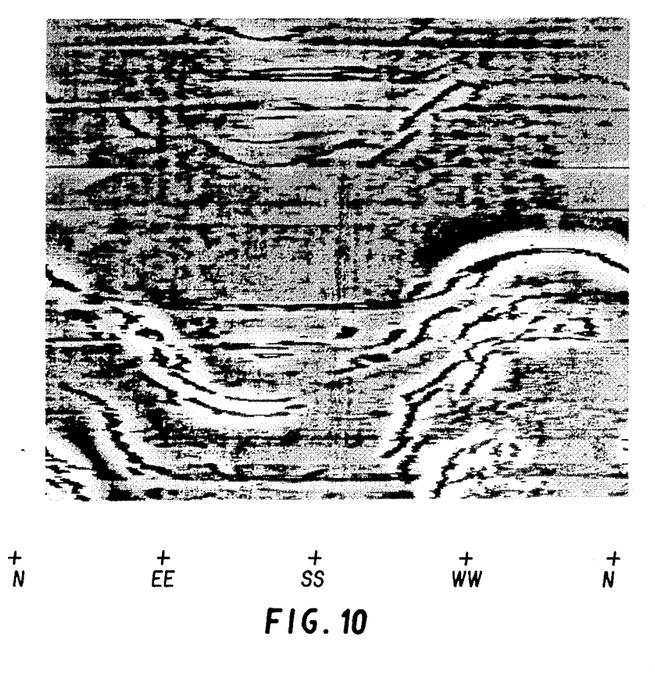
FIG. 10 illustrates the image display of FIG. 9 after application of the signal enhancing technique of the present invention.

The effect of applying this correction function to remove low-frequency amplitude modulation from the borehole reflection signals can be seen in FIGS. 9 and 10. FIG. 9 illustrates an image of the borehole appearing on display 26 without the application of such function; that is, the reflection signals on line 45 from gate 35 were applied directly to the Z-input of display 26, thereby by-passing enhancer 36. This image depicts the logging tool being off-center in the N-S direction, as in the arrangement of FIGS. 5 and 6. With this off-center arrangement, the highest intensity reflection signals are in the N-S directions with the signals being greatly attenuated in the E-W directions. In FIG. 9, only the portions of the borehole wall in the N-S directions can be delineated. FIG. 10 illustrates the same reflection signals being processed in accordance with the present invention by enhancer 36 prior to their application to the Z-input of display 26. It can be seen from FIG. 10 that this off-centering effect of the logging tool on the borehole image has been largely corrected by the signal enhancer 36 so that the entire 360° of the borehole wall can now be delineated.

The following is a more detailed description of the design of the filter, or correction, function implemented in software on a digital computer to remove amplitude modulation from the received reflection signals. In a preferred embodiment, the following flowchart and FORTRAN language code were used with a Hewlett Packard HP 1000 digital computer and an Analogic Corportion AP 500 array processor in accordance with the present invention.

I. LOGARITHM (a) Add offset to the amplitude data.

$$f_1(k,l) = f(k,l) + 1.0 \text{ for } k = 1, \ldots, K; L = 1, \ldots, L.$$

This step is needed before Step b in case there are f(k,l)=0 points.

(b) Apply natural log function to the data Here, the low frequency multiplicative noise (modulation) is converted to low frequency additive noise.

$$f_2(k,l) = Ln [f_1(k,l)] \text{ for } k = 1, \ldots, K; L = 1, \ldots, L.$$

II, FILTERING

Low frequency additive noise is removed from the data by high pass filter. (Most efficient way to do it is in frequency domain as shown below).

(a) $f_2(k,l)$ is transformed from spatial domain to spatial frequency domain by discrete FOURIER transform applied to $f_2(k,l)$. (Most efficient way to do this is by two-dimensional fast FOURIER transform (2DFFT).

$$f_2(k,l) \xrightarrow{\text{2DFFT}} F_2(U,V)$$

(b) Low frequency noise is removed from $F_2(U,V)$ by complex multiplication of $F_2(U,V)$ with high-pass filter mask $H(U,V)$, where $H(U,V)$ can be defined as:

$$H(U,V) = \exp[-D_0/D(U,V)]^N$$

$D_0$ is a constant which determines cut of frequency chosen from 0 to 10 depending on frequency and amplitude of the modulation that is compensated. N is a constant which determines the slope of the filter here used from the range 1 to 4.

$D(U,V) = (U^2 + V^2)^{1/2}$,
typically:

$$U = 1, \ldots \frac{K}{2} + 1$$

$$V = 1, \ldots \frac{L}{2} + 1$$

$$F_3(U,V) = F_2(U,V) \cdot H(U,V)$$

(c) Inverse discrete FOURIER transform is applied to $F_3(U,V)$, this transfers $F_3(U,V)$ from spatial frequency domain to spatial domain (two-dimensional inverse fast FOURIER transform (2DIFT).

$$F_3(U,V) \xrightarrow{\text{2DIFT}} f_3(k,l)$$

III. EXPONENTIAL (a) Exponent (antilog) function is applied to $f_3(K,2)$.

$$f_4(k,l) = \exp[f_3(k,l)] \text{ for } k=1,\ldots,K; L=1,\ldots,L.$$

(b) Offset added in step I(a) is substructed.

$$f_5(k,l) = f_4(k,l) - 1.0 \text{ for } k=1,\ldots,K; L=1,\ldots,L.$$

The following steps may be employed after application of the above-described correction function to optimize the visual presentation of the corrected reflection signals.

IV. SCALE THE DATA (Parameters shown here correspond to eight bits per pixel digital display device). (a) Find maximum value of $f_5(k,l)$.

$$f_{max} = \text{MAX}[f_5(k,l)] \text{ for } k=1,\ldots,K; L=1,\ldots,L.$$

(b) Multiply $f_5(k,l)$ by scaling factor.

$$f_6(k,l) = \frac{255}{f_{max}} \cdot f_5(k,l) \text{ for } k = 1,\ldots,K$$

$$l = 1, \ldots, L$$

(c) Extract integer portion of real data $f_6(k,l)$.

$$f_7(k,l) = \text{INTG }[f_6(k,l)] \; k=1,\ldots,K; l=1,\ldots,L.$$

V. INCREASE DYNAMIC RANGE OF THE DATA (a) Calculate distributive histogram of the data (FORTRAN code for this procedure is shown below).
HIST (256)
DO k=1, K
DO l=1, L
I=$f_7$(k,l)+1
HIST(I)=HIST(I)+1

(b) Calculate cumulative histogram (FORTRAN code for this procedure is shown below).
CHIST(256)
CHIST(1)=HIST(1)
DO I=2,256
CHIST(I)=CHIST (I−1)+HIST(I)

(c) Map the filtered image $f_7(k,l)$ into final image $f_8(k,l)$ using cumulative histogram as a gray level transformation function.
DO k=1, K
DO l=1, L
$f_8$(k,l)=CHIST [$f_7$(k,l)+1]−1.

I claim:

1. A method of displaying acoustic reflection signals obtained from a borehole wherein acoustic energy pulses are transmitted by a transducer assembly located in the borehole and rotated at an offset position from the borehole axis and reflections of such acoustic energy pulses from formations surrounding the borehole are received by said transducer, said reflection signals being amplitude modulated in accordance with the varying oblique angles of incidence of said reflection signals with the borehole wall as the transducer assembly is rotated at said offset position within the borehole, comprising the steps of:

(a) visually displaying signals representative of the reflections received by said transducer assembly so that amplitude variations in said signals can be contrasted visually, and (b) compensating the amplitude modulation of said reflection signals that have oblique angles of incidence with the borehole wall due to the offset of said transducer assembly from the borehole axis so that the entire 360° of the wall of said borehole is delineated visually, said compensation being carried out in accordance with the following steps:

(i) determining the offset of said transducer,
(ii) adding said offset to the reflection signals as follows:

$$f_1(k,l) = f(k,l) + 1.0$$

for k=1,..., k; l=1,..., L, (iii) applying a natural log function to the reflection signals $f_1(k,l)$ from the step (ii) to convert frequency multiplicative noise to low frequency additive noise as follows:

$$f_2(k,l) = Ln[f_1(k,l)]$$

for k=1,..., K; l=1,..., L, (iv) transforming the reflection signals $f_2(k,l)$ from step (iii) from a spatial domain to a spatial frequency domain by applying a two-dimensional fast Fourier transform, 2DFFT, as follows:

$$f_2(k,l) \xrightarrow{2DFFT} F_2(U,V)$$

(V) removing low frequency noise from the reflection signals, $F_2(U,V)$ from step (iv) by complex multiplication of $F_2(U,V)$ with a high-pass filter mask $H(U,V)$ as follows:

$$F_3(U,V) = F_2(U,V) \cdot H(U,V),$$

where $H(U,V) = \exp[-Do/D(U,V)]^N$ with Do being a constant which determines cut of frequency chosen from 0 to 10 depending on frequency and amplitude of the modulation that is compensated, and N being a constant which determines the slope of the filter from the range 1 to 4, and $D(U,V) = (U^2 + V^2)^{1/2}$, with
$U = 1, \ldots, (K/2+1)$, and
$V = 1, \ldots, (L/2+1)$, (vi) transforming the reflection signals $F_3(U,V)$ from step (v) from a spatial frequency domain to a spatial domain by applying a two-dimensional inverse fast Fourier transform, 2 DIFT, as follows:

$$F_3(U,V) \xrightarrow{2DIFT} f_3(k,l),$$

(vii) applying an antilog function to the reflection signals $f_3(k,l)$ from step (vi) as follows:

$$f_4(k,l) = \exp[f_3(k,l)]$$

for $k = 1, \ldots, K$; $l = 1, \ldots, L$ and (viii) subtracting said offset from the reflection signals $f_4(k,l)$ from step (vii) as follows:

$$f_5(k,l) = f_4(k,l) - 1.0$$

for $k = 1, \ldots, K$; $l = 1, \ldots, L$.

2. The method of claim 1 further comprising the step of:

(a) determining the maximum value $f_{max}$ of the reflection signals of step (viii) of claim 1 as follows:

$$f_{max} = MAX[f_5(k,l)]$$

for $k = 1, \ldots, K$; $l = 1, \ldots, L$, (b) multiplying the reflection signals $f_{max}$ from step (a) by a scaling factor, $255/f_{max}$, as follows:

$$f_6(k,l) = f_5(k,l) \cdot 255/f_{max}$$

for $k = 1, \ldots, K$; $l = 1, \ldots, L$, and (c) extracting an integer portion, INTG, of real data from the reflection signals $f_6(k,l)$ from step (b) as follows:

$$f_7(k,l) = INTG[f_6(k,l)]$$

for $k = 1, \ldots, K$; $l = 1, \ldots, L$.

3. The method of claim 2 further comprising the steps of:

(a) calculating a distributive histogram, HIST, of the reflection signals, $f(k,l)$ from step (c) of claim 2 as follows:
HIST(256)
DO k=1,K
Do l=1,L
I=$f_7(k,l)$+1
HIST(I)=HIST(I)+1, (b) calculating a cumulative histogram, CHIST, from the distributive histogram, HIST, from step (a) as follows:
CHIST(256)
CHIST(1)=HIST(1)
DO I=2, 256
CHIST(I)=CHIST(I−1)+HIST(I) and (c) mapping the reflection signals $f_7(k,l)$ from step (c) of claim 2 into a display image, $f_8(k,l)$, using the commutative histogram, CHIST(I) from step (b) as a gray level transformation function as follows:
Do k=1,K
Do l=1,L
$f_8(k,l)$=CHIST[$f_7(k,l)$+1]−1.

* * * * *